(12) United States Patent
Ding

(10) Patent No.: US 10,718,477 B2
(45) Date of Patent: Jul. 21, 2020

(54) SIMULATING ELECTRONIC CANDLE

(71) Applicant: Nantong Ya Tai Candle Arts & Crafts Co., Ltd., Nantong, Jiangsu (CN)

(72) Inventor: Yingqi Ding, Jiangsu (CN)

(73) Assignee: Nantong Ya Tai Candle Arts & Crafts Co., Ltd., Nantong (CN)

( * ) Notice: Subject to any disclaimer, the term of this patent is extended or adjusted under 35 U.S.C. 154(b) by 0 days.

(21) Appl. No.: 16/370,887

(22) Filed: Mar. 30, 2019

(65) Prior Publication Data

US 2019/0226651 A1    Jul. 25, 2019

Related U.S. Application Data

(63) Continuation-in-part of application No. PCT/CN2017/114628, filed on Dec. 5, 2017.

(30) Foreign Application Priority Data

Sep. 22, 2017    (CN) .......................... 2017 1 0287320.2

(51) Int. Cl.
*F21S 6/00* (2006.01)
*F21V 3/02* (2006.01)
(Continued)

(52) U.S. Cl.
CPC ............... *F21S 6/001* (2013.01); *F21S 10/04* (2013.01); *F21V 3/02* (2013.01); *F21V 23/003* (2013.01);
(Continued)

(58) Field of Classification Search
CPC ........ F21S 6/001; F21S 10/04; G02B 6/0008; G02B 6/04; F21V 23/003; F21V 3/02;
(Continued)

(56) References Cited

U.S. PATENT DOCUMENTS

2015/0124474 A1* 5/2015 Ding .................. F21S 6/001
362/554
2015/0300586 A1* 10/2015 Fournier ................. F21L 4/00
362/234

(Continued)

FOREIGN PATENT DOCUMENTS

CN    202302879 U    7/2012
CN    102679269 A    9/2012
(Continued)

OTHER PUBLICATIONS

Chinese Patent Office, first Office action, translation, (Year: 2018).*
(Continued)

*Primary Examiner* — Tracie Y Green

(57) ABSTRACT

A simulating electronic candle, includes a first light body and a second light body, wherein the first light body and the second light body are light-guiding bodies or light-emitting bodies, and a surface portion of the second light body is provided with a light-blocking body; and there is a preset angle between the first light body and the second light body, so that light from the first light body and light from the second light body cooperate with each other to produce an effect of a real flame being divided into three layers. With this simulating electronic candle, it is possible to simulate a situation when a real flame is burning.

6 Claims, 4 Drawing Sheets

(51) Int. Cl.
*F21V 23/00* (2015.01)
*F21V 8/00* (2006.01)
*F21S 10/04* (2006.01)
*F21Y 115/10* (2016.01)
*F21W 121/00* (2006.01)
*F21Y 113/17* (2016.01)
*G02B 6/04* (2006.01)

(52) U.S. Cl.
CPC ....... *G02B 6/0008* (2013.01); *F21W 2121/00* (2013.01); *F21Y 2113/17* (2016.08); *F21Y 2115/10* (2016.08); *G02B 6/04* (2013.01)

(58) Field of Classification Search
CPC .... F21V 19/0015; F21V 1/00; F21Y 2113/17; F21Y 2115/10; F21W 2121/00
See application file for complete search history.

(56) References Cited

U.S. PATENT DOCUMENTS

2015/0338042 A1* 11/2015 Patton ................ F21V 33/0052
348/742
2019/0219238 A1* 7/2019 Yin ........................ F21S 6/001

FOREIGN PATENT DOCUMENTS

| CN | 103574486 A | 2/2014 |
| CN | 104272027 A | 1/2015 |
| CN | 105114907 A | 12/2015 |

OTHER PUBLICATIONS

International search report of PCT Patent Application No. PCT/CN2017/114628 dated Jun. 14, 2018.

* cited by examiner

US 10,718,477 B2

SIMULATING ELECTRONIC CANDLE

CROSS REFERENCE TO RELATED APPLICATIONS

The present application is a Continuation-In-Part Application of PCT Application No. PCT/CN2017/114628 filed on Dec. 5, 2017, which claims the benefit of Chinese Patent Application No. 201710873202.0 filed on Sep. 22, 2017. All the above are hereby incorporated by reference.

TECHNICAL FIELD

The present invention relates to the technical field of electronics, and in particular to a simulating electronic candle.

BACKGROUND ART

The existing candles are mainly ignition-burning candles with low cost, but there are potential safety hazards in use, and they are not environmentally friendly.

Electronic candles have the advantages of being environmentally friendly, energy-saving, safe, and convenient, so they are being liked by more and more people.

The inventor of the present application has found, in a long-term study, that a flame of an ignition-burning candle is generally divided into three layers when burning, which are respectively a flame core, an inner flame and an outer flame, while the electronic candle cannot make this possible, so that the simulation effect is not strong.

SUMMARY OF THE INVENTION

The technical problem mainly solved by the present invention is to provide a simulating electronic candle capable of simulating a situation when a real candle is burning.

In order to solve the above technical problem, a technical solution adopted by the present invention is to: provide a simulating electronic candle, comprising:

a first light body and a second light body, wherein the first light body and the second light body may be light-guiding bodies or light-emitting bodies, and a surface portion of the second light body is provided with a light-blocking body; and there is a preset angle between the first light body and the second light body, so that light from the first light body and light from the second light body cooperate with each other to produce an effect of a real flame being divided into three layers.

The beneficial effects of the present invention are as follows: Different from the prior art, the simulating electronic candle in the present invention comprises: a first light body and a second light body, wherein the first light body and the second light body may be light-guiding bodies or light-emitting bodies, and a surface portion of the second light body is provided with a light-blocking body; and there is a preset angle between the first light body and the second light body, so that light from the first light body and light from the second light body cooperate with each other to produce an effect of a real flame being divided into three layers. With this simulating electronic candle, it is possible to simulate a situation when a real flame is burning, thereby enhancing the simulation effect.

BRIEF DESCRIPTION OF THE DRAWINGS

In order to more clearly illustrate the technical solutions in the embodiments of the present invention, the drawings used in the description of the embodiments will be briefly described below. Obviously, the drawings in the following description are only some embodiments of the present invention, and a person skilled in the art can obtain other drawings according to the drawings without any creative work. In the drawings.

DETAILED DESCRIPTION OF EMBODIMENTS

The technical solutions of the embodiments of the present invention will be clearly and completely described below in conjunction with the accompanying drawings in the embodiments of the present invention; and obviously, the embodiments described are merely some of, rather than all, the embodiments of the present invention. Based on the embodiments of the present invention, the other embodiments obtained by a person skilled in the art under the premise of not involving an inventive effort all fall within the scope of protection of the present invention.

Figure 1:
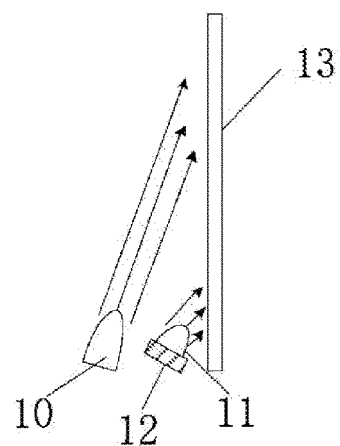
FIG. 1 is a schematic structural view of an embodiment of a simulating electronic candle of the present invention.

Referring to FIG. 1, FIG. 1 is a schematic structural diagram of an embodiment of a simulating electronic candle of the present invention, this simulating electronic candle comprising: a first light body 10 and a second light body 11, wherein the first light body 10 and the second light body 11 may be light-guiding bodies or light-emitting bodies, and the light-emitting body itself emits light while the light-guiding body itself does not emit light but can guide the light emitted by the light-emitting body. One of the first light body 10 and the second light body 11 can be a light-guiding body, and the other a light-emitting body; alternatively, they can both be light-guiding bodies or light-emitting bodies.

In the present embodiment, a surface portion of the second light body 11 is provided with a light-blocking body 12, and there is a preset angle between the first light body 10 and the second light body 11, so that light from the first light body 10 and light from the second light body 11 cooperate with each other to produce an effect of a real flame being divided into three layers.

Figure 2:
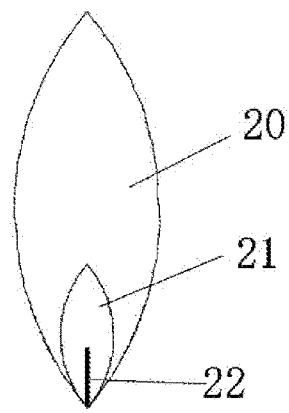
FIG. 2 is a schematic diagram of a flame presented by the simulating electronic candle of FIG. 1.

Specifically, the preset angle can be designed by a designer according to the actual presenting effect. Meanwhile, since there is a certain angle between the first light body 10 and the second light body 11, the lights respectively generated therefrom will not overlap, or if overlap, the brightness of a flame presented will not be uniform after overlapping, so that the flame presented will lead to a phenomenon of being divided into two layers. Meanwhile, the surface portion of the second light body 11 is provided with the light-blocking body 12, and since the light-blocking body 12 has light-blocking properties, it presents an effect like a wick which is burned black when a real candle is burning. At this time, the flame presented by the simulating electronic candle is as shown in FIG. 2, wherein the outer flame 20 is the light illuminated by the first light body 10, the inner flame 21 is the light illuminated by the second light body 11, and the flame core 22 is the projection of the light-blocking body 12, wherein the light-blocking body 12 is at least one of a heat shrinkable tube, an adhesive tape, and a plastic sleeve, or the light-blocking body 12 can also be a coating dyed with a dye, for example, a coating may be applied to the surface portion of the second light body 11 with a black dye, that is, the light-blocking body 12 is formed. Of course, in other embodiments, the light-blocking body 12 can also be any material having light blocking properties, which is not limited herein.

In the above-mentioned embodiment, since there is a certain angle between the first light body 10 and the second light body 11, the flame presented can lead to a phenomenon of having two layers; and furthermore, since the surface portion of the second light body 11 is provided with the light-blocking body 12, and the light-blocking body 12 is like a wick which is burned black when a real candle is burning, so that the flame presented by the simulating electronic candle has three layers, which are respectively a flame core, an inner flame and an outer flame, to simulate a situation when a real flame is burning, and enhancing simulation effect.

Continue referring to FIG. 1, in this embodiment, the simulating electronic candle further comprises: a flame sheet 13.

The light from the first light body 10 and the light from the second light body 11 illuminate on the flame sheet 13 and cooperate with each other to produce an effect of a real flame being divided into three layers. For example, the light from the second light body 11 illuminates at the bottom position of the flame sheet 13, and the light from the first light body 10 illuminates on other positions of the flame sheet 13 except for the bottom position. Optionally, the brightness of the light from the light body 10 differs from that of the light from the second light body 11, so that the brightness at the bottom position of the flame sheet 13 is different from the brightness at other positions, thereby producing a phenomenon of having multi layers. Of course, in other embodiments, the light from the first light body 10 can also illuminate on the entire flame sheet 13, while the light from the second light body 11 illuminates at the bottom position of the flame sheet 13, thereby enhancing the brightness of this position, so that the brightness at the bottom position of the flame sheet 13 is different from the brightness at other positions, and at this time, the brightness of the first light body 10 and the second light body 11 can be the same or different.

Figure 3:
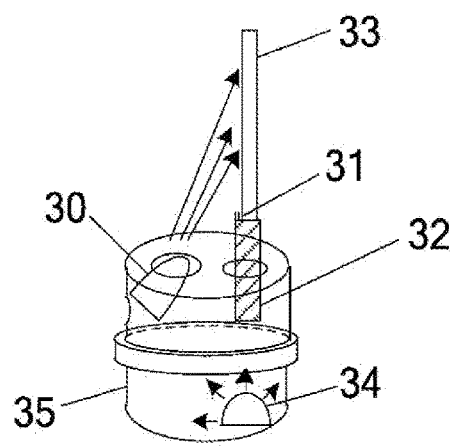
FIG. 3 is a schematic structural view of the simulating electronic candle of FIG. 1 in an application scenario.
Figure 4:
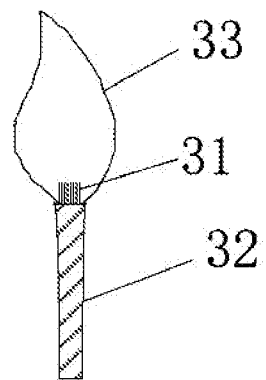
FIG. 4 is a schematic structural view of a flame sheet and a light-blocking body of FIG. 3.

Referring to FIG. 3, FIG. 3 is a schematic structural view of the simulating electronic candle of FIG. 1 in an application scenario, in which the flame sheet 33 and the second light body 31 are wrapped together by the light-blocking body 32, wherein referring to FIG. 4, FIG. 4 is a schematic structural view showing the flame sheet 33 and the second light body 31 being wrapped together by the light-blocking body 32.

Optionally, the light-blocking body 32 is at least one of a heat shrinkable tube, an adhesive tape, and a plastic sleeve. For example, the second light body 31 and the flame sheet 33 can be wrapped together by a black plastic cover.

Optionally, in this application scenario, the simulating electronic candle further comprises: a first light-emitting body 34 and a fixing base 35.

In this application scenario, a first light body 30 is a light-emitting body, and a second light body 31 is a light-guiding body. Optionally, the second light body 31 is an optical fiber bundle comprising at least one optical fiber strand. The optical fiber strand is a fiber made of glass or plastic that can act as a tool for light guiding. The second light body 31 guides part of the light from the first light-emitting body 34 and then the guided light cooperates with the light from the first light body 30 to produce an effect of a real flame being divided into three layers.

Specifically, the first light body 30 and the first light-emitting body 34 are both embedded in the fixing base 35, and the second light body 31 and the flame sheet 33 are wrapped together by the light-blocking body 32, and then the second light body and the flame sheet, which are wrapped together, are inserted, at one end, into the fixing base 35 to enable the second light body 31 to guide part of the light emitted by the first light-emitting body 34, and, at the other end, extend out of the fixing base 35, so that the light emitted by first light body 30 and the light guided by the second light body 31 illuminate on the flame sheet 33 and cooperate with each other to produce an effect of a real flame being divided into three layers.

Figure 5:
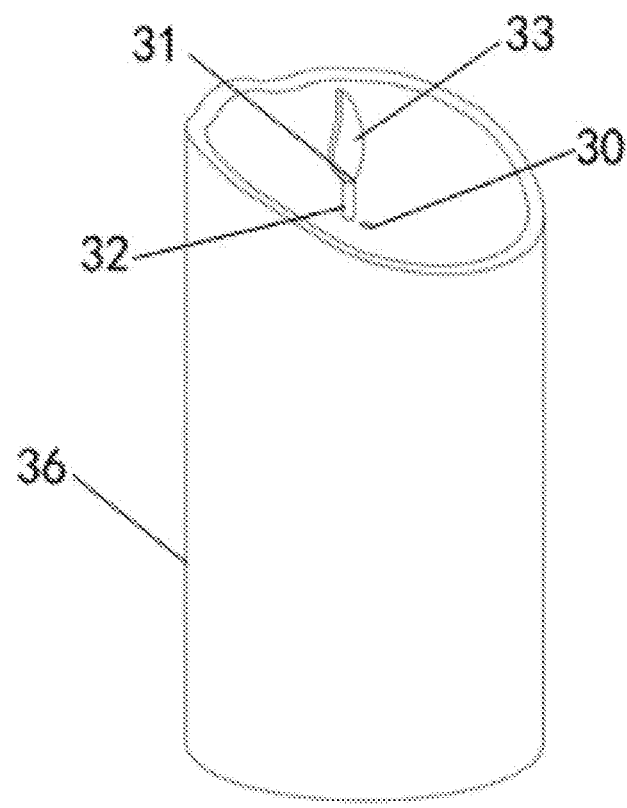
FIG. 5 is a schematic structural view of the simulating electronic candle of FIG. 1 in another application scenario.

Optionally, referring to FIG. 5, in another application scenario, the simulating electronic candle further comprises: a candle body 36.

It can be understood that the shape of the candle body 36 in FIG. 5 is only for illustrative purposes, and is not limited herein. The specific shape can be designed by the designer according to customer requirements.

Figure 6:
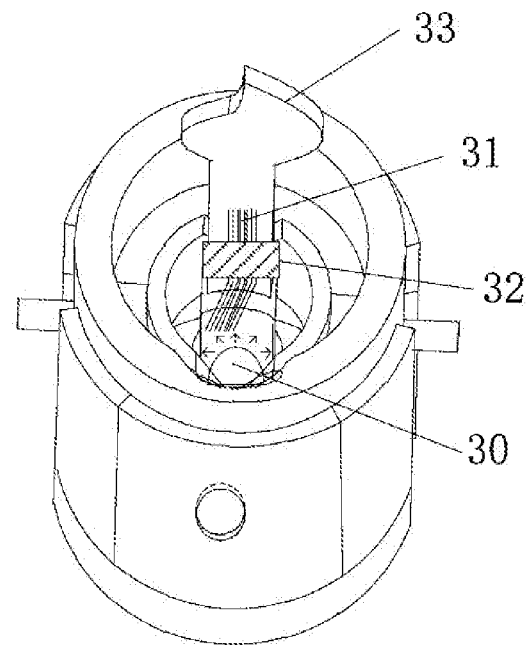
FIG. 6 is a schematic structural view of the simulating electronic candle of FIG. 1 in still another application scenario.

Referring to FIG. 6, FIG. 6 is a schematic structural view of the simulating electronic candle of FIG. 1 in another application scenario in which when the first light body 30 is a light-emitting body and the second light body 31 is a light-guiding body, the second light body 31 can also guide part of the light from the first light body 30 and then the guided light cooperates with and the light from the first light body 30 to produce an effect of a real flame being divided into three layers, that is, compared to the above-mentioned application scenario, no additional light-emitting body is needed, so that the cost and the number of the elements can be saved.

Figure 7:
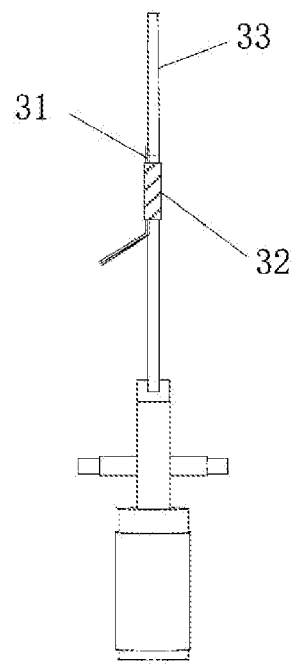
FIG. 7 is a partial schematic structural view of the simulating electronic candle of FIG. 6.

Specifically, in conjunction with FIGS. 6 and 7, in order for the second light body 31 to be able to guide the light emitted by the first light body 30, one end of the second light body 31 is wrapped together with the flame sheet 33 by the light-blocking body 32, and the other end bends and extends toward the first light body 30.

Figure 8:
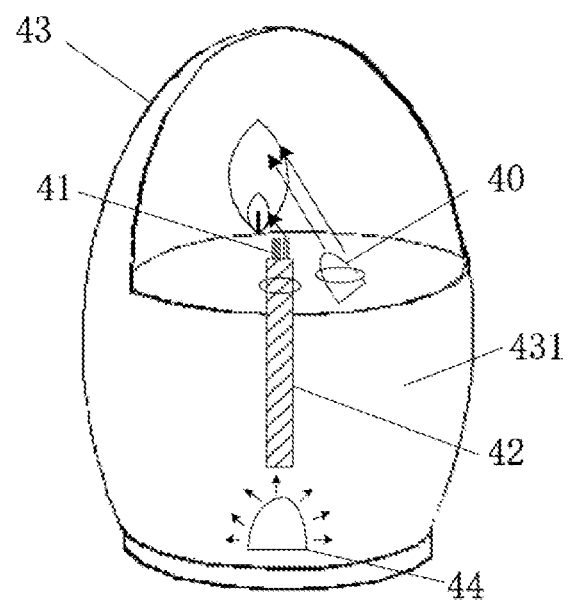
FIG. 8 is a schematic structural view of another embodiment of the simulating electronic candle of the present invention.

Referring to FIG. 8, FIG. 8 is a schematic structural view of another embodiment of the simulating electronic candle of the present invention. In this embodiment, in addition to a first light body 40, a second light body 41 and a light-blocking body 42, the simulating electronic candle further comprises a candle body 43, and at the same time, the candle body 43 is provided with a cavity 431.

The light from the first light body 40 and the light from the second light body 41 illuminate on the candle body 43 and cooperate with each other to produce an effect of a real flame being divided into three layers.

It is to be understood that there is also no limitation on the shape of the candle body 43 in the present embodiment.

In one application scenario of the present embodiment, the first light body 40 is a light-emitting body, and the second light body 41 is a light-guiding body. Optionally, the second light body 41 is an optical fiber bundle comprising at least one optical fiber strand, and a surface portion of the second light body 41 is provided with the light-blocking body 42, The simulating electronic candle further comprises a first light-emitting body 44, wherein the light-emitting body 44 is located in the cavity 431, one end of the second light body 41 is inserted into the cavity 431, and the other end extends upwardly out of the cavity 431, to guide the light emitted by the first light-emitting body 44, and the second light body 41 guides part of the light from the first light-emitting body 44 and then the guided light cooperates with the light from the first light body 40 to produce an effect of a real flame being divided into three layers on the candle body 43. And at the same time, the light emitted by the first light-emitting body 44 can illuminate the cavity 431, thereby enhancing the aesthetics effect of the simulating electronic candle.

In another application scenario of the present embodiment, when the first light body 40 is a light-emitting body and the second light body 41 is a light-guiding body, the second light body 41 can also guide part of the light from the first light body 40, and then the guided light cooperates with the light from the first light body 40 to produce an effect of a real flame being divided into three layers, that is, at this time, no additional light-emitting body is needed, so that the cost and the number of the elements can be saved.

Specifically, one end of the second light body 41 can be bent to extend towards the first light body 40 so as to guide part of the light from the first light body 40.

Optionally, in the present embodiment, other elements (not shown), such as a seven-color light, may be disposed in the cavity 431 to enhance the aesthetics effect of the simulating electronic candle.

Figure 9:
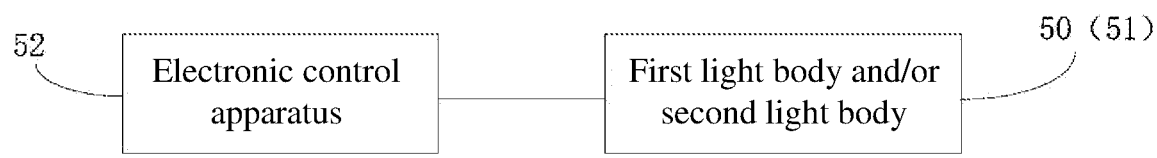
FIG. 9 is a circuit diagram of the simulating electronic candle of the present invention in an application scenario.

Referring to FIG. 9, FIG. 9 is a schematic circuit diagram of the simulating electronic candle of the present invention in an application scenario, this simulating electronic candle further comprising: an electronic control apparatus 52.

When the first light body 50 and/or the second light body 51 are/is light-emitting bodies/a light-emitting body, the electronic control apparatus 52 is connected to the first light body 50 and/or the second light body 51 for controlling light emitting by the first light body 50 and/or the second light 51. Optionally, in order to be closer to a flame of a real candle when it is burning, the color of the light emitted by the first light body 50 and/or the second light body 51 is a warm color, for example, it may be yellow, orange and red.

Figure 10:
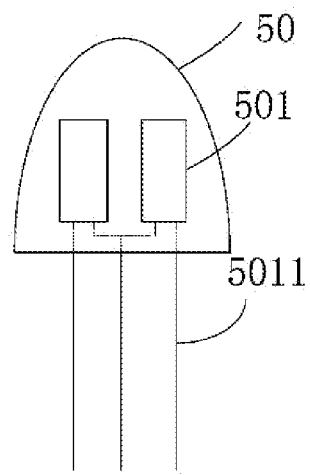
FIG. 10 is a schematic structural view of a first light body/second light body of the simulating electronic candle of the present invention in an application scenario.

Optionally, in this application scenario, as shown in FIG. 10, when the first light body 50 and/or the second light body 51 are/is light-emitting bodies/a light-emitting body, the first light body 50 and/or the second light body 51 comprise/comprises at least two light-emitting devices 501, the at least two light-emitting devices 501 alternately emitting light to produce a flickering effect, wherein the light-emitting devices 501 are light-emitting diodes.

In this application scenario, the electronic control apparatus 52 controls the color of the light emitted by at least one of the at least two light-emitting devices 501 to change; or, the intensity of the light emitted by at least one of the at least two light-emitting devices 501 is changing so as to produce a flickering effect, so that it is possible to simulate a situation in which a flame is blown by wind when a real candle is burning, thereby enhancing flame effect presented by the simulating electronic candle.

At the same time, in this application scenario, the number of pins 5011 of the first light body 50 and/or the second light body 51 may be two, three or more. Specifically, the at least two light-emitting devices 501 may be connected in series or in parallel, wherein when the at least two light-emitting devices 501 are connected in series, the number of the pins 5011 of the first light body 50 and/or the second light body 51 may be two; and when the at least two light-emitting devices 501 are connected in parallel, the at least two light-emitting devices 501 can at least share one pin. In the prior art, one light-emitting device needs to lead out two leads, positive and negative, so two light-emitting devices need to lead out four leads. While in the present application scenario, the negative electrodes of the at least two light-emitting devices 501 can be connected together and then led out using one negative line. For example, when the number of the light-emitting devices 501 is two, two positive lines and one negative line can be led out, in which case the first light body 50 and/or the second light body 51 have three pins 5011.

It can be understood that, when the first light body 50 and/or the second light body 51 have N light-emitting devices 501, in order to reduce the number of pins, electrodes of the same polarity of the N light-emitting devices 501 can be connected together, for example, the negative electrodes are connected together to lead out a negative line, while the positive line of each of the light-emitting devices 501 is led out respectively. At this time, the first light body 50 and/or the second light body 51 may have only (N+1) pins, where N is a positive integer greater than or equal to 2.

Of course, in other application scenarios, there may be only one light-emitting device 501 included in the first light body 50 and/or the second light body 51, and the number of the light-emitting device 401 is not limited herein.

The description above merely relates to the embodiments of the present invention, and is not intended to limit the scope of the invention. Any equivalent structure or equivalent process transformation made by using the contents of the description and drawings of the invention, or any direct or indirect application of the contents of the description and drawings of the invention in other related technical fields, is equally included in the patent protection scope of the invention.

The invention claimed is:

1. A simulating electronic candle, comprising: a flame sheet, a first light body and a second light body, wherein a surface portion of the second light body is provided with a light-blocking body; and there is a preset angle between the first light body and the second light body, so that light from the first light body and light from the second light body cooperate with each other to produce an effect of a real flame being divided into three layers;

wherein the light from the first light body and the light from the second light body illuminate on the flame sheet and cooperate with each other to produce the effect of a real flame being divided into three layers;

the flame sheet and the second light body are wrapped together by the light-blocking body;

the first light body is a light-emitting body, and the second light body is a light-guiding body; and the second light body guides part of the light from the first light body and then the guided light cooperates with the light from the first light body to produce the effect of a real flame being divided into three layers.

2. The simulating electronic candle according to claim 1, wherein,
the light-blocking body is at least one of a heat shrinkable tube, an adhesive tape, and a plastic sleeve.

3. The simulating electronic candle according to claim 1, wherein,
the light-guiding body is an optical fiber bundle comprising at least one optical fiber strand.

4. The simulating electronic candle according to claim 1, further comprising:
an electronic control apparatus, which is connected to the first light body and/or the second light body, for controlling light emitting by the first light body and/or the second light.

5. The simulating electronic candle according to claim 1, wherein,
the first light body comprises at least two light-emitting devices which change light emitting to produce a flickering effect,
wherein the light-emitting devices are light-emitting diodes, and the changing of light emitting means that:
the color of light emitted from at least one of the at least two light-emitting devices is changing, so that the colors of lights emitted from the at least two light-emitting devices are changing relatively/the general color of the lights emitted from the at least two light-emitting devices is changing; or
the intensity of light emitted from at least one of the at least two light-emitting devices is changing, so that the intensities of lights emitted from the at least two light-emitting devices are changing relatively/the general intensity of the lights emitted from the at least two light-emitting devices is changing.

6. The simulating electronic candle according to claim 1, wherein,
one end of the second light body is wrapped together with the flame sheet by the light-blocking body, and another end thereof bends and extends toward, but does not contact the first light body.

* * * * *